United States Patent [19]

Adams

[11] 4,176,831

[45] Dec. 4, 1979

[54] TEMPLATE FOR SUPPORTING A DOOR FRAME

[75] Inventor: Alphonso Adams, Washington, D.C.

[73] Assignee: Helen H. Adams, Washington, D.C.; a part interest

[21] Appl. No.: 924,558

[22] Filed: Jul. 14, 1978

[51] Int. Cl.² ............................................. E04F 21/04
[52] U.S. Cl. .................................... 269/17; 269/296; 269/321 F
[58] Field of Search ..................... 269/17, 321 F, 296; 214/1 D, 1 SW

[56] References Cited

U.S. PATENT DOCUMENTS

| 2,815,566 | 12/1957 | Hille ..................................... 214/1 D |
| 2,997,292 | 8/1961 | Lucker et al. ......................... 269/296 |
| 3,001,244 | 9/1961 | Kronquist ........................... 269/321 F |
| 3,851,868 | 12/1974 | Lagasse ............................... 269/321 F |

FOREIGN PATENT DOCUMENTS 2227470 10/1973 Fed. Rep. of Germany .......... 214/1 D Primary Examiner—Robert C. Watson
Attorney, Agent, or Firm—Birch, Stewart, Kolasch & Birch

[57] ABSTRACT

The present invention is directed to a support for positioning a door frame adjacent a masonry wall which is under construction. The support includes two substantially horizontal members which are mounted on wheels so as to be readily moved about a construction site. Further, the support includes two substantially vertical upright members which are connected at approximately the midpoint of the horizontal members and to which a door frame is releasably attached. The support of the present invention ensures the accurate positioning of a door frame as a masonry wall is constructed and the door frame attached thereto.

7 Claims, 6 Drawing Figures

TEMPLATE FOR SUPPORTING A DOOR FRAME

BACKGROUND OF THE INVENTION

1. Field of the Invention

The present invention is directed to a support which ensures the accurate positioning of a door frame relative to a masonry wall which is under construction.

2. Prior Art

It is conventional in the construction trades to support a door frame adjacent a masonry wall which is under construction by means of wood bracing. The wood bracing usually includes two members which are attached to the cement subflooring by means of cut nails or other appropriate cement fasteners. The conventional wood bracing further includes at least two members which project upwardly from the member attached to the cement subflooring to hold the door frame in position relative to the masonry wall which is under construction.

This conventional method of supporting a door frame relative to a masonry wall which is under construction often damages the cement subflooring. Further, this conventional method is not completely accurate and therefore does no ensure the exact positioning of the door frame relative to the masonry wall which is under construction. In addition, the conventional method is costly and requires a substantial amount of time to construct.

SUMMARY OF THE INVENTION

It is an object of the present invention to construct a support for positioning a door frame relative to a masonry wall which is under construction.

Another object of the present invention is to provide a support for ensuring the correct positioning of the door frame in a straight and plumb position relative to the masonry wall which is under construction.

A further object of the present invention is to construct a support for positioning a door frame which does not damage the cement subflooring.

A still further object of the present invention is to construct a support which may readily be used to accurately position a door frame to reduce the cost of construction and to reduce the time necessary for positioning the door frame.

A still further object of the present invention is to construct a support which is mounted on wheels so as to be readily transported from one location to another within a construction site.

Another object of the present invention is to provide a support for positioning a door frame which is adjustable to various widths of door frames.

These and other objects of the present invention are accomplished by providing two substantially horizontal support members which are mounted on wheels to facilitate transportation of the support. Further, the support includes two substantially vertical members which are connected at approximately the midpoint of the two substantially horizontal members. The two substantially vertical members are designed to engage a door frame and accurately position it relative to a masonry wall which is under construction. The two substantially horizontal support members and the two substantially vertical support members are connected together by a rod which is adjustable to accommodate various widths of conventional door frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

Figure 1:
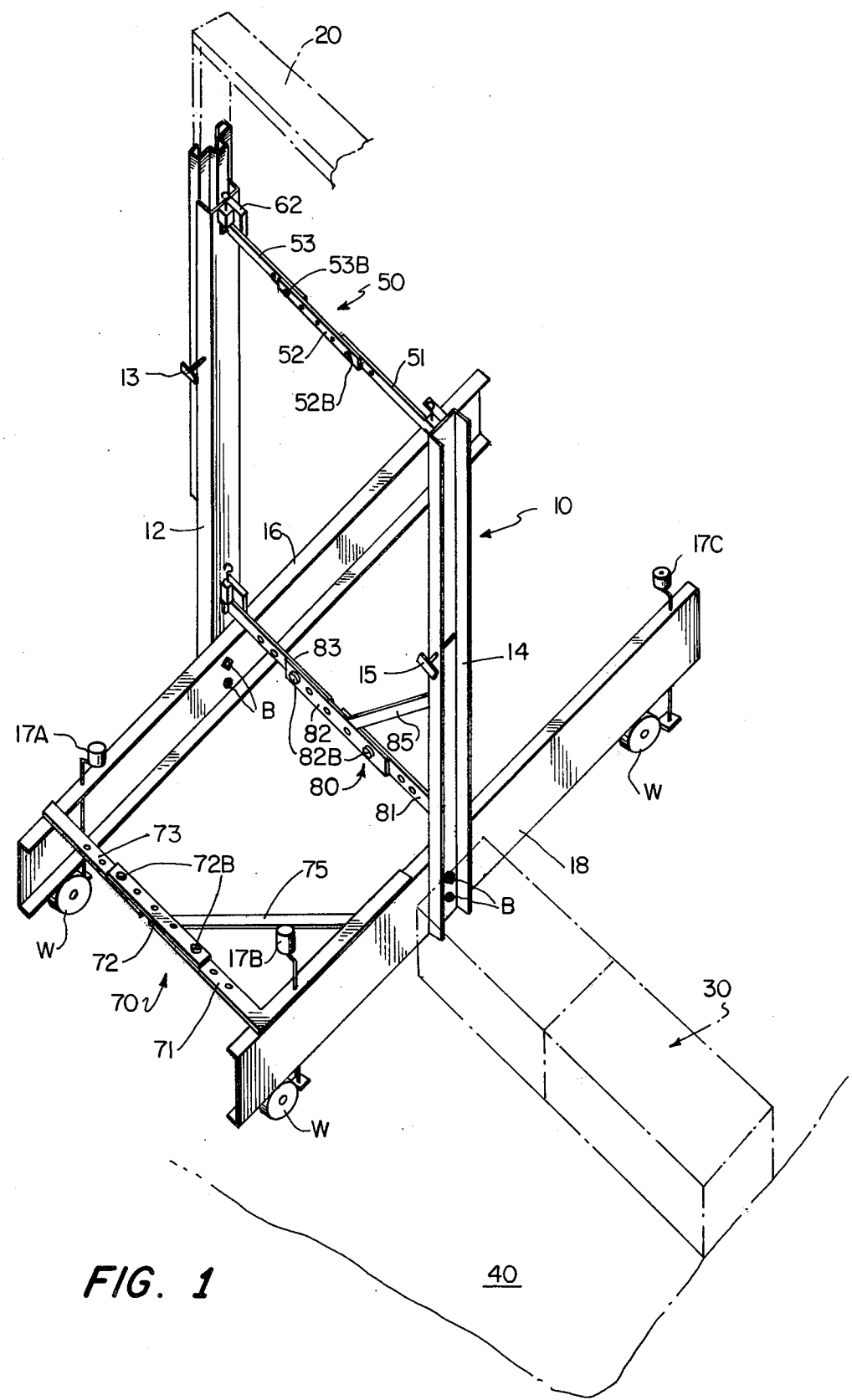
FIG. 1 illustrates a perspective view of the support structure of the present invention.

FIG. 1 illustrates a support member 10 which is used to position a door frame 20 relative to a masonry wall 30 which is under construction. As is conventional in the construction trades, it is desirable to position a door frame, which is usually made of metal, adjacent a masonry wall which is under construction. The metal door frame must be accurately positioned relative to the masonry wall so that as the wall is constructed the metal door frame may be tied to the masonry wall by means of conventional clips or anchors. More particularly, as the masonry wall 30 increases in height the bricklayer would periodically position a clip or anchor between a course of brick or concrete block to secure a portion of the door frame 20 to the masonry wall. It is extremely important that the door frame 20 is accurately positioned relative to the wall to ensure the proper operation of a door which will eventually be mounted on the door frame 20.

A door frame 20 is releasably attached to the vertical supports or channels 12, 14 by means of frame holding screws 13, 15. Although two frame holding screws are illustrated in FIG. 1, it should be readily understood that more than one frame holding screw per vertical support or channel may be utilized to releasably secure the door frame 20 to the support 10.

The vertical supports or channels 12, 14, are connected to the horizontal supports 16, 18, respectively, by means of bolts B. The bolts B firmly affix the vertical supports or channels relative to the horizontal supports. Firmly affixing the frame members relative to each other will ensure that the support member 10 will accurately position a door frame 20 relative to a wall 30 which is under construction.

The horizontal support 16 includes two leveling and adjustment screws. As illustrated in FIG. 1, only the front leveling and adjustment screw 17A is shown. Similarly, the horizontal support 18 includes two leveling and adjustment screws 17B, 17C. The leveling and adjustment screws are threaded through the openings in the horizontal supports 16, 18. By rotating the leveling and adjustment screws the horizontal support members 16 and 18 are raised above the concrete subfloor 40.

After a door frame 20 is releasably secured to the support 10, an individual may readily move the door frame to the desired location adjacent a masonry wall which is under construction. After the door frame 20 is positioned adjacent the masonry wall 30, the leveling and adjustment screws 17A, 17B, 17C, and 17D (not shown) are adjusted so that the horizontal support members 16, 18 are elevated so as to be supported by the pads positioned adjacent each of the lower ends of the leveling and adjustment screws. Each leveling and adjustment screw is individually adjusted so that the door frame 20 is correctly positioned relative to the masonry wall 30. This individual adjustment of the leveling and adjustment screws ensures that the door frame 20 will be plumb.

Figure 2:
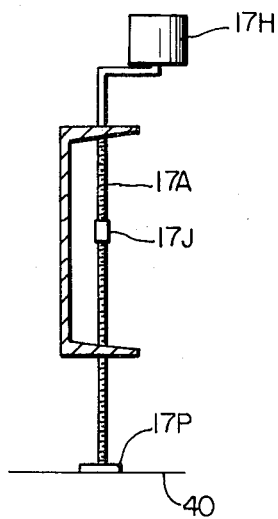
FIG. 2 illustrates a cross-sectional view of a horizontal support member including a leveling and adjustment screw according to the present invention.

As illustrated in FIGS. 1 and 2, the horizontal support 16 includes a leveling and adjustment screw 17A which is threaded through openings in the support 16. The leveling and adjustment screw 17A includes a pad 17P positioned at the lowermost end thereof. Further, the leveling and adjustment screw may include a handle 17H which is connected to the crank portion of the leveling and adjustment screw 17A. In an embodiment of the present invention the leveling and adjustment 17A may be made in two portions which are connected together by a connector or joint 17J.

Figure 3:
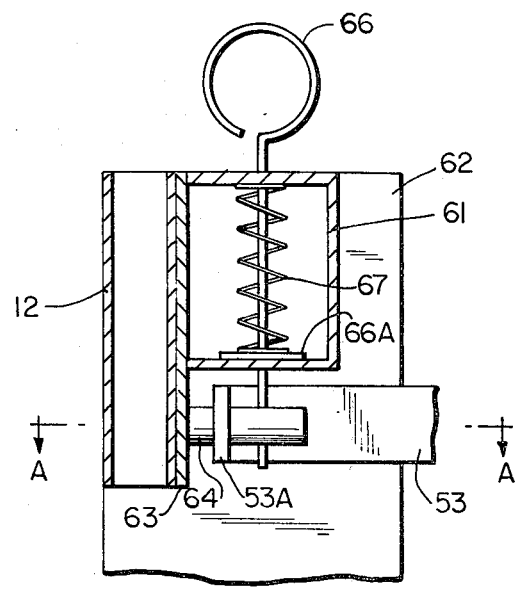
FIG. 3 illustrates a spring lock mechanism for retaining the adjustment bar of the vertical support members according to the present invention.
Figure 6:
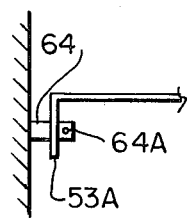
FIG. 6 illustrates a cross-sectional view taken along line A—A of FIG. 3.

As illustrated in FIGS. 1, 3 and 6 the vertical supports or channels 12, 14 are connected at their uppermost end by a second adjustment bar generally indicated by numeral 50. The adjustment bar 50 includes three sections 51, 52 and 53. The section 52 may be bolted through openings in the sections 51 and 53 so as to adjust the relative positioning of the vertical supports or channels 12, 14 relative to each other. Although the drawings illustrate the section 52 as being bolted to the sections 51, 53 by means of the bolts 52B, it should be readily understood that any manner of connecting these sections relative to each other may be utilized in the present invention.

The outermost end of the sections 51, 53 is L-shaped. The L-shaped section 53A includes an opening through which the pin 64 is inserted. As illustrated in FIGS. 3 and 6, the pin 64 is connected to a plate 63 which is affixed to the vertical support or channel 12. A box 61 is attached to the plate 63 and a second plate 62. The box 61 serves as a spring housing in which the locking pin 66 is spring biased downwardly by means of the spring 67.

As illustrated in FIG. 3, the L-shaped portion 53A of the section 53 includes an opening through which the pin 64 is inserted. After the L-shaped portion 53A is inserted on the pin 64 the locking pin 66 is permitted to reciprocate downwardly through an opening 64A in the pin 64 to lock the L-shaped portion 53A to the vertical support or channel 12. As illustrate in FIG. 3, the locking pin 66 includes a member 66A which is affixed thereto and against which the force of the spring 67 is exerted.

Figure 4:
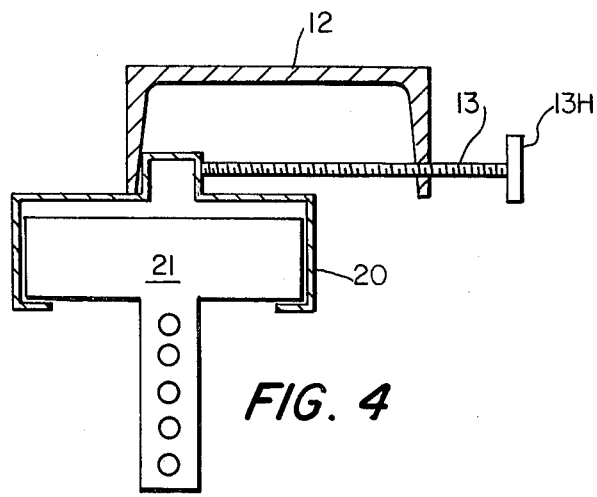
FIG. 4 illustrates a cross-sectional view of the frame holding screw and a vertical support member according to the present invention.

FIG. 4 illustrates a cross-sectional view of the vertical support or channel 12 including the frame holding screw 13. The frame holding screw 13 includes a handle portion 13H which may be designed to be grasped by an individuals hand and rotated so as to releasably secure the door frame 20 to the vertical support or channel 12. It should be understood, that the frame holding screw 13 may be a conventional threaded bolt which may be turned by means of a wrench or pliers. As illustrated in FIG. 1, each vertical support or channel 12, 14 includes at least one frame holding screw 13, 15.

As previously discussed, the door frame 20 is secured to the wall 30 by means of a plurality of clips or anchors 21. The clips or anchors 21 are designed to fit within the channeled section of the door frame 20 and are substantially T-shaped. As illustrated in FIG. 4, the leg of the T-shaped clip or anchor 21 includes a plurality of holes through which mortar may be inserted to securely affix the clip or anchor to the wall 30.

Figure 5:
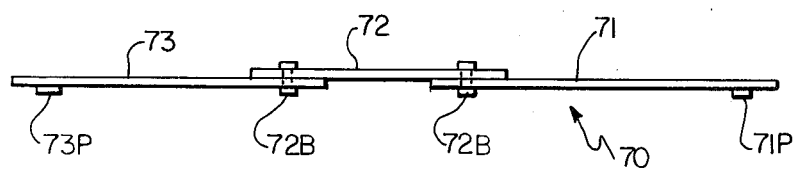
FIG. 5 illustrates a cross-sectional view of the adjustable bar member used in combination with the horizontal support members according to the present invention.

FIG. 5 illustrates a side view of the adjustment bar 70 which is utilized to connect the first horizontal support 16 to the horizontal support 18. As illustrated in FIGS. 1 and 5, the adjustment bar 17 includes three sections 71, 72 and 73 which are designed to be affixed relative to each other by means of bolts 72B. The section 72 may be bolted to the sections 71, 73 so as to adjust the relative width of the horizontal support 16 relative to the horizontal support 18. Adjusting the adjustment bars 70 and 50 permits the template or support of the present invention to be utilized to support a plurality of different widths of door frames. The adjustment bar 70 includes an L-shaped section 71 which has one leg thereof affixed to the horizontal support 18 and the other leg thereof projecting outwardly towards the horizontal support 16. The two legs of the section 71 are connected to each other by means of a brace 75. As illustrated in FIG. 5, the adjustment bar 70 includes two downwardly projecting pins 71P, 73P which are inserted in openings in the horizontal supports 18, 16, respectively.

An additional adjustment bar 80 may be positioned adjacent to the connection between the vertical supports and the horizontal supports. The additional adjustment bar 80 is similar in construction to the first adjustment bar 70 and includes three sections 81, 82 and 83 which are designed to be affixed relative to each other by means of bolts 82B. The section 82 may be bolted to the section 81, 83 so as to incrementally adjust the relative width of the horizontal and vertical supports. Adjusting the adjustment bars 50, 70 and 80 permits to the template or support of the present invention to be utilized to support a plurality of different widths of door frames. The additional adjustment bar 80 includes an L-shaped section 81 which has one leg thereof affixed to the vertical support 14 and the other leg projecting outwardly towards the horizontal support 16. The two legs of the L-shaped section 81 are connected to each other by means of a brace 85. As illustrated in FIG. 1, the additional adjustment bar 80 may be connected to the vertical supports 12, 14 by means of locking pins in the same manner as the second adjustment bar 50.

OPERATION OF THE PREFERRED EMBODIMENT

The template or support 10 of the present invention may be readily used to position a door frame 20 adjacent a masonry wall 30 which is under construction. An individual would merely position the door frame 20 within the open portion of the vertical supports or channels 12, 14 and secure the door frame thereto by means of the frame holding screws 13, 15. It should be understood, that the template or support 10 illustrated in FIG. 1 of the drawings may be constructed to be approximately 30 to 48 inches in height whereas the standard door frame utilized in the building trades is approximately seven to seven and one-half feet in height.

After an individual has secured the door frame 20 to the template or support 10, he may readily move the unit to the appropriate position adjacent a masonry wall 30 which is under construction. Movement of the template or support 10 is facilitated by means of a plurality of wheels W one of which is positioned adjacent to each end of the horizontal supports 16, 18.

The width of the template or support 10 may be readily adjusted by means of the adjustment bars 50, 70 and 80. It should be understood, that although three adjustment bars are illustrated in the drawings the present invention may readily incorporate additional adjustment bars positioned along the support members to enhance the stability thereof. The template or support 10 is designed to accommodate a variety of different widths of door frames ranging from 30 inches to 48 inches. The holes in the sections 51, 52, 53, 71, 72 and 73 are specifically positioned so as to incrementally advance the width of the template or support 10 to accommodate standard incremental increases in door frames. After the door frame 20 is secured to the template or support 10 and the unit is moved to the appropriate position adjacent a masonry wall 30 the handles of the leveling and adjustment screws 17A through 17D are rotated so as to precisely position the door frame 20 relative to the masonry wall 30. The precise positioning of the door frame is necessary to ensure the proper operation of a door which may be subsequently mounted thereon. Each of the leveling and adjustment screws 17A through 17D may be individually operated so as to ensure a plumb door frame.

The template or support 10 of the present invention may remain in position until the masonry wall 30 has cured. Thereafter, the template or support 10 may be disengaged from the door frame 20 and used to support another door frame which is to be located within the building.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A support for positioning a door frame adjacent to an opening in a wall comprising:

two substantially horizontal support members spaced relative to each other by at least first adjustment bar;

said first adjustment bar being adjustable in predetermined incremental units to incrementally space said substantially horizontal support members apart by a predetermined distance;

a substantially vertical support member attached to and projecting upwardly from each of said substantially horizontal support members, said substantially vertical support members being spaced relative to each other by at least one second adjustment bar;

said second adjustment bar being adjustable in predetermined incremental units to incrementally space said substantially vertical support members apart by a predetermined distance;

said predetermined incremental spacing between said substantially horizontal support members being selectively equal to said predetermined incremental spacing between said substantially vertical support members; and said substantially vertical support members being channel shaped to receive a door frame therein and frame holding means being operatively positioned to releasably secure the door frame thereto.

2. A support for positioning a door frame according to claim 1, wherein said two substantially horizontal support members are mounted on means for facilitating movement.

3. A support for positioning a door frame according to claim 2, said means for facilitating movement comprising a plurality of wheels.

4. A support for positioning a door frame according to claim 1, said frame holding means comprising at least one frame holding screw.

5. A support for positioning a door frame according to claim 1, said two substantially horizontal support members including a means for leveling and adjusting said substantially horizontal support members relative to a surface on which they are positioned.

6. A support for positioning a door frame according to claim 5, said means for leveling and adjusting said substantially horizontal support members comprising a leveling and adjusting screw positioned adjacent end portions of said substantially horizontal support members.

7. A support for positioning a door frame according to claim 1, wherein an additional adjustment bar is positioned adjacent to an attachment point between each of said substantially vertical supports and said substantially horizontal supports and being adjustable in predetermined incremental units to incrementally space said substantially horizontal supports and said substantially vertical supports apart by a predetermined distance selectively equal to said predetermined incremental spacing of said first and second adjustment bars.

* * * * *